APPARATUS FOR SEPARATING GAS FROM LIQUID
Original Filed July 2, 1963 3 Sheets-Sheet 1
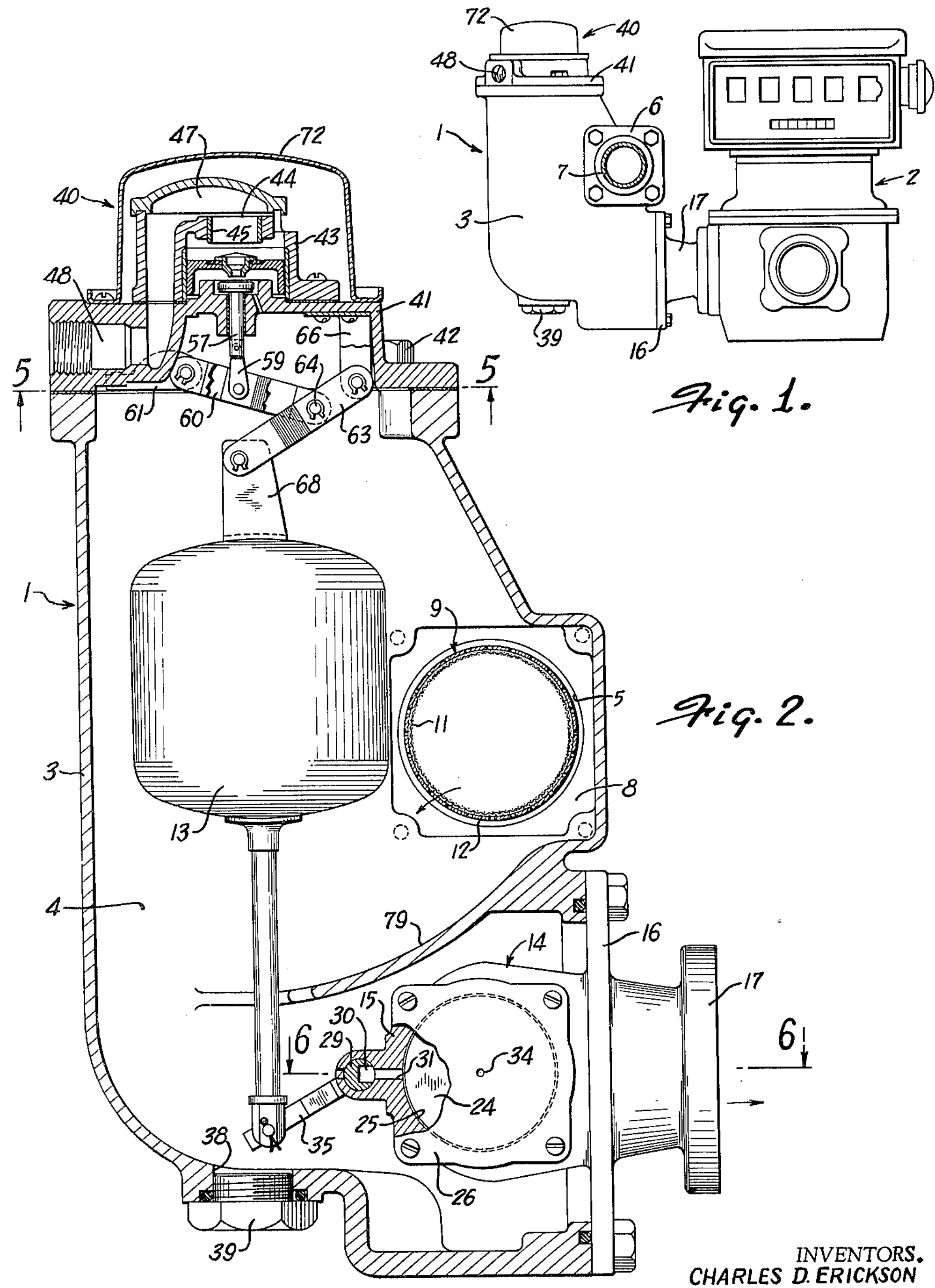
INVENTORS.
CHARLES D. ERICKSON
JOEL L. STANSELL
STEPHEN STASENKO
BY
Andrus & Starke
ATTORNEYS

APPARATUS FOR SEPARATING GAS FROM LIQUID

Original Filed July 2, 1963 3 Sheets-Sheet 2

INVENTORS.
CHARLES D. ERICKSON
JOEL L. STANSELL
BY STEPHEN STASENKO

Andrus & Starke
ATTORNEYS

APPARATUS FOR SEPARATING GAS FROM LIQUID

Original Filed July 2, 1963 3 Sheets-Sheet 3

INVENTORS.
CHARLES D. ERICKSON
JOEL L. STANSELL
STEPHEN STASENKO
BY
Andrus & Starke
ATTORNEYS United States Patent Office — 3,252,473 — Patented May 24, 1966

3,252,473
APPARATUS FOR SEPARATING GAS FROM LIQUID

Charles D. Erickson, Joel L. Stansell, and Stephen Stasenko, all of Erie, Pa., assignors to A. O. Smith Corporation, Milwaukee, Wis., a corporation of New York Continuation of application Ser. No. 292,401, July 2, 1963. This application Apr. 26, 1965, Ser. No. 453,555
4 Claims. (Cl. 137—174)

This is a continuation of application Serial No. 292,401, filed July 2, 1963, now abandoned.

This invention relates to an apparatus for separating gas liquids and more particularly to an apparatus for automatically eliminating air or other gas from a stream of flowing liquid.

When conducting liquids, such as petroleum oils, solvents, organic chemicals and the like, it is desirable to eliminate air and other gases from the stream of flowing liquid. This is particularly true where the liquid is metered, for free air or entrained gases passing through the meter will provide erroneous readings.

The present invention is directed to an apparatus for separating air or other gas from a stream of flowing liquid in a metering line. More specifically, the air eliminating device includes a float chamber having a liquid inlet and a liquid outlet which is connected to the metering device. The chamber is also provided with an air outlet which is located at the upper end of the chamber.

A float is mounted within the chamber and is responsive to the liquid level therein and the float is operably connected to a pair of pilot valves. One of the pilot valves is adapted to open and close the liquid outlet and the second valve is adapted to open and close the air outlet in the chamber.

Under normal operation, the air vent valve is closed and the control valve is open so that liquid will flow through the chamber to the meter. However, when either air or a liquid-air mixture enters the float chamber, a rapid displacement of liquid occurs around the float which causes the float to lose buoyancy and drop. Downward movement of the float opens the pilot valve controlling the air vent valve to permit air to escape from the chamber and subsequently closes the control valve to prevent air and liquid from flowing to the meter. The air vent valve opens a short interval, usually a fraction of a second, before the control valve closes. Opening the air vent valve first, decreases the internal pressure more rapidly, speeding the closing action of the control valve. In addition, during the air elimination cycle the control valve will open and close due to fluctuation in liquid level, and opening the air vent valve first, insures free venting of air during the entire cycle. Closing the air vent valve first also helps control the liquid level when air is being vented.

The air vent valve mechanism includes a cylinder and a piston is slidable within the cylinder. The piston carries a valve member which opens and closes the air outlet. When the piston is in the uppermost position, the valve member closes off the air outlet and when the piston is lowered, the air outlet is opened. Both the upper and lower surfaces of the piston are exposed to the pressure within the float chamber, but as the upper surface of the piston has a smaller area exposed to the pressure than the lower surface of the piston, the pressures normally tend to keep the piston in the upper position to close the air vent valve.

The control valve mechanism includes a valve member carried by a piston which is slidable in a cylinder. The pressure of the liquid in the control valve chamber acts against one surface of the piston to normally maintain the valve member in the open position so that liquid can flow freely from the outlet. When the float lowers, the float movement acts through a linkage to open a pilot valve and expose both surfaces of the piston to the pressure of the liquid. The force of a spring acting against the opposite surface of the piston then urges the valve member to the closed position to prevent flow of liquid from the apparatus.

The gas and liquid separation apparatus of the invention is of simple construction in which all components are located within a single housing, and this eliminates external tubing and other elements which are normally associated with a conventional air-gas separating mechanism.

In addition, better accuracy is obtained, for there is no by-pass of liquid and air around the meter as occurs in many conventional devices of this type.

Other objects and advantages will appear in the course of the following description.

The drawings illustrate the best mode presently contemplated for carrying out the invention.

In the drawings:

FIG. 1 is a side elevation of the gas-liquid separating device connected in a flow line with a meter;

FIG. 2 is a vertical section of the gas-liquid separating device of the invention;

The drawings illustrate a gas-liquid separating device 1 which is connected up stream in a liquid flow line from a meter 2. The gas separator 1 is adapted to remove free air or entrained gas which may be present in the flowing liquid before the liquid enters the meter.

Figure 3:
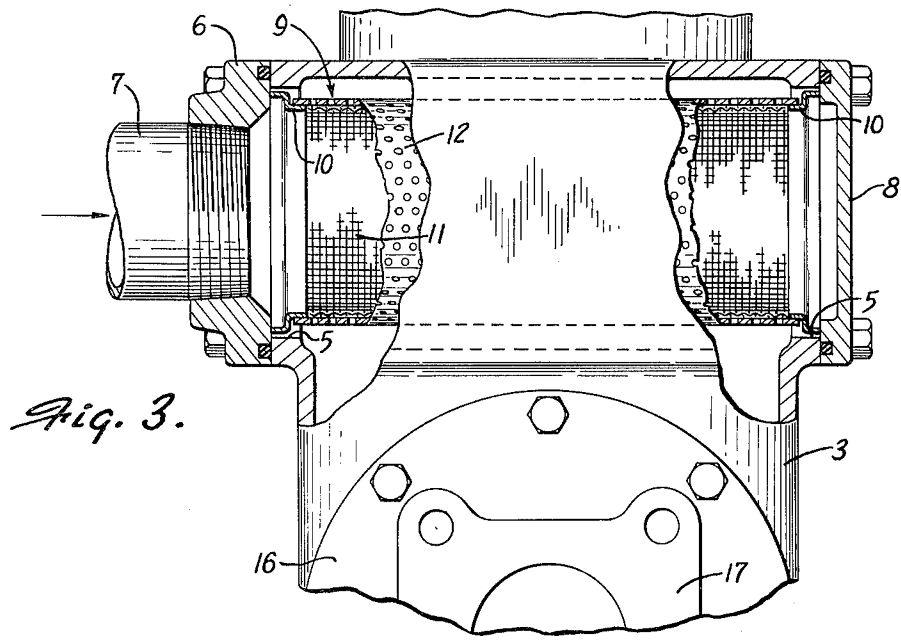
FIG. 3 is an enlarged fragmentary end view of the gas-liquid separating device with parts broken away in section and showing the liquid inlet to the device.

The gas separator 1 includes a housing or casing 3 which defines a liquid float chamber 4. The liquid is introduced into the chamber 4 through one of a pair of aligned inlet openings 5. As best shown in FIG. 3, only one of the inlets 5 is used at a given time. A fitting 6 is secured by bolts to the wall of the casing surrounding one of the inlets 5, and a conduit 7 is threaded into the fitting. The other of the inlets 5 is closed off by a plate 8 which is also secured to the housing 3 by bolts.

The liquid entering the housing 3 through the inlet 5 passes through a generally cylindrical strainer-diffuser 9 which serves to remove foreign material from the liquid and diffuse the liquid stream.

As best shown in FIG. 3, the strainer-diffuser 9 includes a pair of end rings 10 which bear against the fitting 5 and plate 8 respectively. The liquid is strained by a pair of concentric screens 11 and 12 which are secured by soldering to the inner, smaller diameter, portion of end rings 10. The outer screen 12 is preferably made of perforated cadmium plated steel, while the inner screen can be formed of wire cloth made of a corrosion-resistant material such as Monel metal, stainless steel, brass or the like. While a flat screen can serve to provide the screening function, the concentric cylinders 11 and 12 have definite advantages. The perforated outer steel cylinder 12 provides the best diffuser configuration, both for optimum performance and economy. The screen 11 is merely inserted within the outer perforated cylinder. A further advantage of the cylindrical shape is that the same diffuser-strainer 9 can be used for both of the inlets 5.

Figure 6:
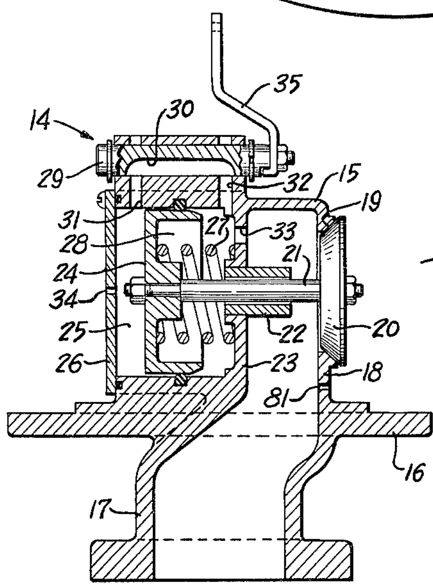
FIG. 6 is a section taken along line 6—6 of FIG. 2 and showing the liquid outlet valve mechanism.

A float 13 is located within the float chamber 4 and is responsive to the liquid level within the chamber. The float 13 is adapted to be operably connected to a control valve mechanism 14 which controls the flow of liquid from the chamber 4 to the meter 2. As best shown in FIGS. 2 and 6, the control valve mechanism includes a valve body 15 having a flange 16 which is secured by bolts to the outer wall of the casing 3. The valve body 15 includes an outlet fitting 17 which is adapted to be connected to the inlet of the meter 2.

The wall 18 of the valve body 15 is provided with an opening 19 which provides communication between the outlet 17 and the chamber 4. The opening 19 is adapted to be opened and closed by a valve disc 20 which is carried by a valve stem 21 slidable within bushing 22. The bushing 22 is mounted within a central wall 23 of the valve body 15 and the stem 21 carries a piston 24 which is slidable within cylinder 25. As shown in FIG. 6, the outer end of the cylinder 25 is closed off by a plate 26.

The piston 24 is biased outwardly toward the plate 26 to urge valve 21 to the closed position by a coil spring 27 which is located within a recess 28 formed in the piston 24.

Movement of the piston 24 within the cylinder 25 is controlled by a rotary pilot valve element 29 which is mounted for rotation within an opening in the valve body 15. The rotary pilot valve element 29 is provided with a groove 30 which is adapted to establish communication between a pair of ports 31 and 32. The ports 31 and 32, as best shown in FIG. 6, are located at opposite ends of the cylinder 25. In addition to the ports 31 and 32, an opening 33 is provided in the central wall 23 and establishes communication between the outlet 17 and the cylinder 25. A small high pressure inlet orifice 34 is also provided in the plate 26 and provides communication between the cylinder 25 and the float chamber 4.

The rotary pilot valve element 29 is adapted to be rotated by movement of the float 13. In this regard, one end of the valve element 29 is pivotally connected by a link 35 to the lower end of the float rod 36 which extends downwardly from the float 13.

In the normal operation of the apparatus, with the float in the upper position, the groove 30 is out of alignment with ports 31 and 32, and the pressure of the liquid within the float chamber 4 acts through the high pressure inlet orifice 34 in plate 26 and, being greater than the pressure on the opposite side of piston 24, pushes the piston against spring 27, as shown in FIG. 6, to thereby open the valve 20 and permit the liquid to flow through the outlet 17.

When the float lowers within the float chamber 4, the valve element 29 is rotated to bring the groove 30 into alignment with the ports 31 and 32. This permits the fluid within the high pressure portion of the cylinder 25 to pass through port 31, groove 30 and port 32 to the low pressure area behind the piston to thereby equalize the pressure on both sides of the piston. With the pressure equalized, the spring 27 will urge the piston 24 in the direction of plate 26, as shown in FIG. 6, to thereby close the valve disc 20.

The casing 3 is also provided with a drain outlet 38 which is normally closed off by a plug 39.

Figure 4:
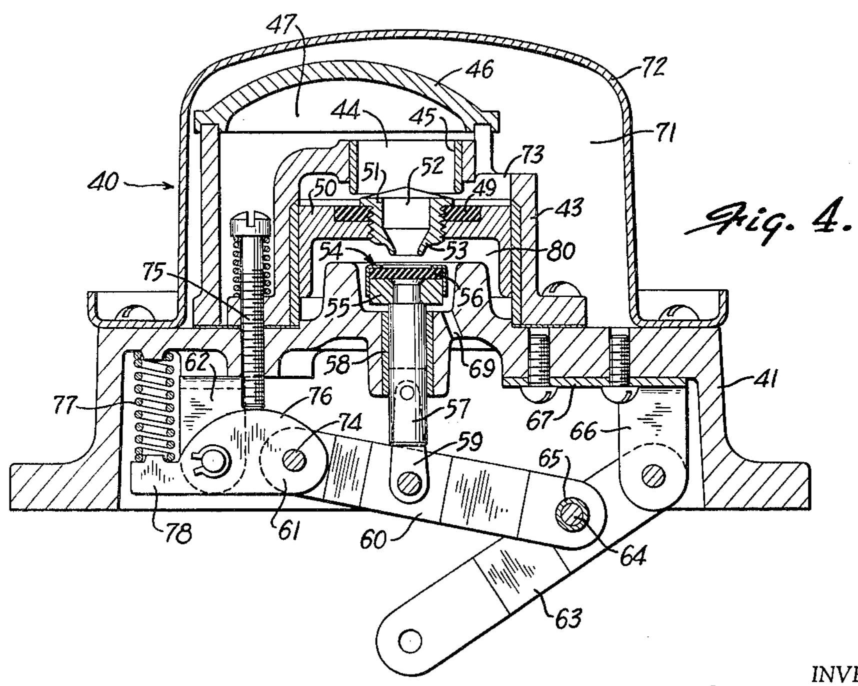
FIG. 4 is an enlarged vertical section showing the air vent valve mechanism.
Figure 5:
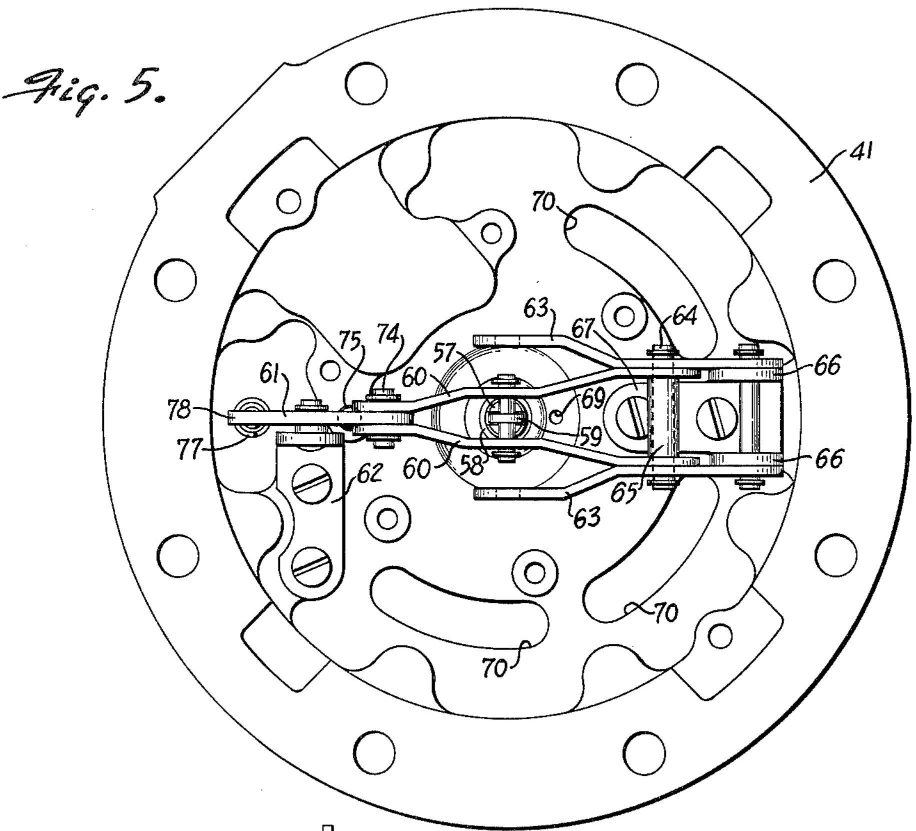
FIG. 5 is a section taken along line 5—5 of FIG. 2.

Air or other gas, which may be entrained with the liquid flowing into the chamber 4, is released from the casing 3 by an air valve mechanism indicated generally by 40. The air valve mechanism, as best shown in FIG. 4, includes a head 41 which is secured in sealed relation to the upper end of the casing 3 by a series of bolts 42. A cylinder 43 is mounted in sealed relation on the upper surface of the head 41 and is provided with a central outlet opening 44. A sleeve 45 is secured within the opening 44 and provides a valve seat. As shown in FIG. 4, a cover 46 is secured to the cylinder 43 and defines a passage 47 which communicates between the central opening 44 and an air outlet passage 48 formed in head 41. The passage 48 communicates with the atmosphere.

The central opening 44 in cylinder 43 is adapted to be closed off by an annular resilient valve member 49 carried by a movable piston 50 which is slidable within the cylinder 43. The piston 50 is provided with a central opening and the valve member 49 is secured within a recess bordering the opening. In addition, a ring 51 is mounted within the opening and the upper end of the ring is provided with an outwardly extending flange which partially overlaps the valve member 49, but is spaced radially inward from the periphery of the valve member so that the valve member can engage the lower end of valve seat 46 to close off opening 44 when the piston 50 is in the upper position. The ring 51 has a central opening 52 and the lower end of the ring, as indicated by 53, tapers inwardly to provide a neck or valve seat of lesser diameter. The opening 52 is adapted to be closed off by a pilot valve 54, which includes head 55 having a resilient insert 56 adapted to bear against the valve seat 53. A stem 57 extends downwardly from the valve head 55 and is slidable within a bushing 58 secured within an opening in the head 41.

The pilot valve 54 is adapted to be operably connected to the float and is moved vertically in accordance with vertical movement of the float within the chamber 4. As shown in FIGS. 2 and 4, the lower end of the valve stem 57 is pivotally connected by link 59 to the central portion of a pair of arms 60. Corresponding ends of arms 60 are pivotally connected to the end of a cam 61 which is pivotally mounted on a bracket 62 secured to the lower surface of head 41.

The opposite ends of the arms 60 are pivotally connected to the central portion of a pair of arms 63 by pin 64. The pin 64 extends through a spacer sleeve 65 which maintains the proper separation or spacing of the arms 60 and 63. The upper ends of the arms 63 are pivotally connected to legs 66 which extend downwardly from a bracket 67 attached to the lower surface of head 41 while the lower ends of the arms 63 are pivotally connected to a lug 68 which extends upwadly from the float 13. With this linkage, a definite ratio of movement is established between the float 13 and pilot valve 54. Also links 63 and 60 are specifically designed to provide a mechanical advantage which decreases the buoyant force required to seal the air vent valve, when exposed to gravity pressure only, and conversely to decrease the gravity force necessary to open the pilot valve against high pressures.

In order to reduce the force which is required to open the valve 49, both the upper and lower surfaces of the piston 50 are exposed to the pressure within the chamber 4. To expose the lower surface of piston 50 to the pressure in chamber 4, a port 69 is formed in head 41. The pressure within the chamber 4 acts through the port 69 against the lower surface of the piston to thereby urge the piston upwardly within the cylinder 43.

The upper surface of the piston 50 is exposed to the pressure within the chamber 4 by means of a series of openings 70 which are formed in a head 41. The openings 70 provide communication between chamber 4 and a chamber 71 located within external cover 72. The upper end of cylinder 43 is also provided with an opening 73 so that pressure within the chamber 4 will act through the openings 70, chamber 71 and opening 73 against the upper surface of the piston 50.

With this construction, pressure within chamber 4 acts against both the upper and lower surfaces of the piston 50. However, the area exposed to the pressure of chamber 4 is substantially greater on the lower surface of the piston than the upper surface of the piston due to the fact that atmospheric pressure is acting in openings 52 and 44, the piston 50 will be held upwardly against the valve seat 45 to close the opening 44. When the float lowers within the chamber 4, the pilot valve 54 will be opened causing pressure in the portion of the cylinder 43 beneath piston 50 to bleed through opening 52 to passage 47 which is at atmospheric pressure. For a moment, the underside of the piston 50 has a lower pressure, while the upper surface still has higher pressure acting through opening 73. This pressure forces the piston downwardly to break away from the valve seat 54. Additional downward travel of the piston 50 is then provided by gravity.

The relationship between the opening of the pilot valve 29, the buoyancy line of the float and the liquid level in the chamber 4, can be adjusted by raising or lowering the pivot point 74 between the arms 60 and cam 61. Adjustment of the pivot point 74 also varies the relationship of the opening of the air valve mechanism 40 and the closing of the control valve mechanism 14. This adjustment is provided by a stud 75 which is threaded within an opening in the head 41 and bears against the upper curved surface 76 of cam 61. The upper surface 76 is urged upwardly against the lower end of stud 75 by a coil spring 77 which is located between the lower surface of head 41 and the end 78 of the link. By threading the stud within the opening within the head, the position of pivotal connection 74 between the cam 61 and arms 60 can be varied. As previously mentioned, this adjustment varies the relationship between opening of the pilot valve 54 and the liquid level in housing 3 and also adjusts the relationship of the opening of the air valve 49 and the closing of the liquid valve 20. Also the distance the float 13 and pilot valve 54 travel can be controlled by the adjustment of stud 75.

To prevent excessive pressure buildup in the discharge line, a vent hole or orifice 81 is provided in wall 18. When the discharge line, extending from meter 2 to a discharge location, is closed, the pressure in outlet 17 will be increased and the pressure on both sides of piston 24 will be equalized with the result that the spring 27 forces the valve disc to the closed position. The pressure in the closed off discharge line can be further increased if the discharge line is subjected to high temperatures such as exposure to the sun. Thus, vent 81 serves to equalize the pressure between chamber 4 and the discharge line when valve disc 20 is closed and prevents excessive pressure buildup in the discharge line.

To permit air bubbles to move freely upward from the strainer-diffuser 9 to the upper end of casing 3, the casing is provided with a sloping wall 82 located above the strainer-diffuser.

In operation of the air-gas separation device, the liquid normally enters the casing 3 through conduit 7 and passes through the strainer-diffuser 9. A baffle 79 located beneath the strainer-diffuser prevents the liquid from flowing directly onto the liquid valve mechanism 14 and serves to lengthen the flow path, increasing separation time, between the inlet and the outlet. The length of the flow path is directly proportional to the required response time of the unit, the shorter the path the faster it must operate in order to prevent air from passing through the unit. In normal operation, the float is in an upper position and the air vent valve 49 is in the upper closed position while the control valve 20 is open, thereby permitting liquid to flow through the outlet 17 into the meter 2.

Due to the connecting linkages at each end, the float has a limited stroke of vertical travel and is not entirely free-floating. During normal operation, the liquid level in chamber 4 is above the buoyancy line of the float. The buoyancy line is the line on the float which would be located at liquid level if the float was free-floating, or in other words, the buoyancy line is the position where the weight of the float equals the displacement force. If a charge of air or a liquid-air mixture enters the casing through the strainer-diffuser 9, rapid displacement of liquid around the float causes the float to lose buoyancy and drop. As the liquid level drops, it approaches the buoyancy line of the float and when the liquid level reaches the buoyancy line, the float will then move downwardly with the liquid level. Lowering of the float causes the pilot valve 54 to open, and the pressure from chamber 80 bleeds into the opening 52 which is atmospheric pressure. For a short interval, the pressure in chamber 80 beneath piston 50 is lower than that above piston 50 causing the valve member 49 to break away from the valve seat 45. This enables the air within the chamber 4 to bleed through the openings 70, chamber 71, opening 73 and opening 44 to outlet passage 48.

The use of the floating piston 50 enables a substantially lesser force to open the valve 49 and release the air. For example, if the pressure in chamber 4 and cylinder 43 was 100 p.s.i., and passage 47 had atmospheric pressure, a 44 pound force on the piston 50 would be required to directly open and close the valves. However, with the present construction, only 1.2 pounds are required to open the pilot valve 54 because the area through the orifice neck 52 is approximately .0125 square inch as compared with .442 square inch for the opening 44 in the valve seat. The large opening 44 through the cylinder is needed, however, to evacuate the air rapidly. Thus, the floating piston enables a substantially smaller force to be employed to open the valve and yet enables large volumes of air to be discharged through the larger outlet opening 44.

A short interval after the opening of the air vent valve 44, the liquid valve 20 begins to close by virtue of the downward movement of the float.

Generally, the linkages are set so that the float will move down about ½ inch before the control valve 20 begins to close. As previously described, downward movement of the float causes the valve element 29 to rotate and thereby equalize the pressure on both sides of the piston 24. The force of the spring 27 then closes the valve 20 and prevents liquid from flowing from the chamber 4. The control valve 20 is fully closed before the float reaches its lowermost position in its stroke of travel. The buoyancy line of the float at its lowermost position of travel is at the level of, or slightly above, the center line of the inlet 5. The lowermost position of the float is set by the linkages at either end of the float, and even though the liquid level in chamber 4 may go below the center line of inlet 5, the float will not follow the liquid level and the buoyancy line will remain above the center line of the inlet 5.

After the air has been eliminated, the liquid level will rise. When the liquid level reaches the buoyancy line of the float, the float will rise with the liquid level. After the float has risen a predetermined distance, the float will again operate to rotate the valve member 29 and high pressure will enter the cylinder chamber through the orifice 34 in plate 26 to open the valve 20 and restore the flow. The control valve 20 will be completely open about ½ inch before the float reaches its uppermost position. As the float approaches its uppermost position, the float acts through linkages 63 and 60 to close the pilot valve 57 and the air vent valve 44.

The present invention provides a simple and effective mechanism for automatically eliminating the air in a liquid flow line. All of the operating equipment is contained in a single housing and auxiliary by-pass lines and conduits are eliminated.

In addition, the air is eliminated without the necessity for by-passing a small portion of the liquid and gas around the meter, as is done in many conventional types of separators and this provides better accuracy for the unit.

Various modes of carrying out the invention are contemplated as being within the scope of the following claims particularly pointing out and distinctly claiming the subject matter which is regarded as the invention.

We claim:

1. In an apparatus for removing gas from liquid, said apparatus comprising a casing defining a liquid reservoir having a liquid inlet and a liquid outlet connected to a discharge line, and said apparatus having float means responsive to the level of liquid in said liquid reservoir, the improvement comprising means defining a chamber, a pressure responsive member disposed within the chamber, a valve member operably connected to the pressure responsive member and adapted to open and close the liquid outlet in the casing, means for urging the valve member to the closed position, restricted passage means for continuously exposing one side of the pressure responsive member to the pressure of the liquid in the casing, said valve member and said pressure responsive member being arranged so that the pressure acting on said one side of the pressure responsive member tends to urge the valve member to the open position, the cross sectional area of said pressure responsive member being greater than the cross sectional area of the liquid outlet, and pilot valve means operably connected to the float means and arranged to provide communication between said one side of the pressure responsive member and the discharge line when the float means is in its lowered position so as to effect closing of said valve member by equalizing pressure between said one side of the pressure responsive member and said discharge line, and said pilot valve means arranged to terminate communication between said one side of said pressure responsive member and the discharge line when the float means is in its raised position so as to permit the pressure of the liquid within the casing to act on said one side of said pressure responsive member and open said valve member.

2. In an apparatus for removing gas from liquid, said apparatus comprising a casing defining a liquid reservoir having a liquid inlet and a liquid outlet, and said apparatus having float means operably connected to valve means and responsive to the level of liquid in said reservoir, the improvement comprising means defining a chamber, a piston slidably disposed within the chamber, a valve member operably connected to the piston and adapted to open and close the liquid outlet in the casing, means for urging the valve member to the closed position, restricted passage means for providing continuous communication between the interior of the casing and one end of the chamber for continuously exposing one end of the piston to the pressure of the liquid in the casing, said valve member and said piston being arranged so that the pressure within said end of the chamber and acting on said end of the piston tends to urge the valve member to the open position, the cross sectional area of said piston being greater than the cross sectional area of the liquid outlet, pilot valve means operably connected to the float means and arranged to provide communication between said end of the chamber and the discharge line when the float means is in a lowered position so as to effect closing of said valve member by equalizing pressure between said end of the chamber and said discharge line, and said pilot valve means arranged to terminate communication between said end of the chamber and the discharge line when the float means is in a raised position so as to permit the pressure of the liquid within the casing to act on said end of the piston and open said valve member.

3. In an apparatus for removing gas from liquid, said apparatus comprising a casing defining a liquid reservoir having a liquid inlet and a liquid outlet, and said apparatus having float means operably connected to valve means and responsive to the level of liquid in said reservoir, the improvement comprising means defining a chamber, a piston slidably disposed within the chamber, a valve member operably connected to the piston and adapted to open and close the liquid outlet in the casing, means for urging the valve member to the closed position, restricted passage means providing communication between the interior of the casing and one end of the chamber for continuously exposing one end of the piston to the pressure of the liquid in the casing, said valve member and said piston being arranged so that pressure within said end of the chamber and acting on said end of the piston tends to urge the valve member to the open position, the cross sectional area of said piston being greater than the cross sectional area of the liquid outlet, conduit means connecting said end of the chamber to the discharge line, and rotary valve means located in the conduit means and operably connected to said float means, said rotary valve means being arranged to provide communication between said end of the chamber and the discharge line when the float means is in a lowered position so as to effect closing of the valve means by equalizing pressure between said end of the chamber and said discharge line, and said rotary valve means being arranged to terminate communication between said end of the chamber and the discharge line when the float means is in a raised position so as to permit the presence of liquid within the casing to act within said end of the chamber on said end of the piston to open said valve member.

4. The structure of claim 3, and including by-pass conduit means directly connecting the interior of the casing to said discharge line, said by-pass conduit means having a restricted cross-section and serving to equalize the pressure in the interior of the casing and the discharge line when said valve member is closed.

References Cited by the Examiner

UNITED STATES PATENTS 1,078,783 11/1913 Grimm ------------ 137—195
1,738,809 12/1929 Walter ---------- 137—195 X ISADOR WEIL, *Primary Examiner.*

ALAN COHAN, *Examiner.*